US005660676A

United States Patent [19]

Brooks

[11] Patent Number: 5,660,676

[45] Date of Patent: Aug. 26, 1997

[54] HIGH SPEED LABELER

[76] Inventor: Robert E. Brooks, 1416 Finegrove, Hacienda, Calif. 91745

[21] Appl. No.: 545,301

[22] Filed: Oct. 19, 1995

[51] Int. Cl.[6] .................................................. B32B 31/00

[52] U.S. Cl. .......................... 156/361; 156/363; 156/364; 156/541; 156/542; 226/25; 226/34; 226/35

[58] Field of Search .................................... 156/361, 362, 156/363, 364, 541, 542; 226/5, 21, 23, 25, 34, 35, 124

[56] References Cited

U.S. PATENT DOCUMENTS

| | | | |
|---|---|---|---|
| 2,441,791 | 5/1948 | Bostwick | 156/361 |
| 3,193,211 | 7/1965 | Flood . | |
| 3,238,080 | 3/1966 | Schluter | 156/542 X |
| 3,403,066 | 9/1968 | Ikelheimer | 226/124 X |
| 4,013,204 | 3/1977 | Hellemans | 226/21 |
| 4,194,941 | 3/1980 | Briggs et al. . | |
| 4,294,644 | 10/1981 | Anderson . | |
| 4,454,808 | 6/1984 | Wehr et al. | 226/25 X |
| 4,617,080 | 10/1986 | Kobayashi et al. . | |
| 4,842,660 | 6/1989 | Voltmer et al. | 156/361 X |
| 4,867,833 | 9/1989 | McCoy . | |
| 4,896,793 | 1/1990 | Briggs et al. . | |
| 4,954,203 | 9/1990 | Matsumoto | 156/361 |
| 5,011,561 | 4/1991 | Carlus et al. | 156/361 X |
| 5,032,211 | 7/1991 | Shinno et al. . | |
| 5,188,696 | 2/1993 | Good, Jr. | 156/361 |
| 5,232,540 | 8/1993 | Southwell et al. . | |
| 5,248,355 | 9/1993 | Olsen . | |
| 5,250,129 | 10/1993 | Twele . | |

FOREIGN PATENT DOCUMENTS

| | | | |
|---|---|---|---|
| 940208 | 10/1963 | United Kingdom | 156/542 |

*Primary Examiner*—James Engel
*Assistant Examiner*—Paul M. Rivard
*Attorney, Agent, or Firm*—Litman, McMahon and Brown, L.L.C.

[57] ABSTRACT

An improved laid-on labeler is designed for substantially increased operating speeds when compared to prior art systems. The labeler includes an articulating labeling arm with a label peel blade. The labeling arm is attached to a support structure at a pivot point immediately above and below which are a respective pair of deflecting idler rollers through which a continuous label web is fed. With the label web being supported at the pivot point of the labeling arm, torque on the labeling arm from starting and stopping the label web is minimized. The label web passes between a drive roller and respective nip rolls on both a pay-out and a take-up side which relieves differential tension on the label web as it passes over the peel blade, thus minimizing or eliminating tearing and breaking of the web as drive speeds increase. Control is via a PLC, which also controls a variety of optional features.

37 Claims, 4 Drawing Sheets

HIGH SPEED LABELER

BACKGROUND OF THE INVENTION

1. Field of the Invention

This invention is directed to an improved high speed labeler, and more particularly to such a labeler for labeling fruit, vegetables or other relatively small, discrete items. The inventive labeler is designed such that a specialized labeling web feed roller and a unique routing for the labeling web allow substantially increased labeling speeds over prior art labelers.

2. Description of the Related Art

Labelers for labelling fruit, vegetables and other small, discrete items traveling on a conveyor are well known. Such labelers are of four general types. Vacuum or "bellows" type labelers typically include a number of applicators arrayed about a circular head. Labels are stripped from a continuous web and, as each label is stripped, a respective one of the applicators picks up the label via a vacuum drawn on the applicator. As a piece of fruit approaches the circular head, the applicator applies an adhesive side of the label to the fruit and the adhesive overcomes the relatively weak vacuum such that the label adheres to the fruit. A second type of labeler is a "blow on" or compressed air labeler in which compressed air is triggered by the presence of a piece of fruit to be labeled, with the burst of air being directed toward an individual label which is then blown onto the fruit. A third labeling type is a "tamp apply" type in which labels are tamped onto the fruit with a piston-type applicator, with the label being released upon contact. Finally, a fourth type of labeler is a "laid-on" labeler in which a peel blade is positioned at the end of an articulating labeling arm. A continuous web of labels are threaded past the peel blade. The web is selectively advanced when a piece of fruit is sensed on the conveyor such that individual labels are stripped from the continuous label web by the peel blade at the exact moment that a piece of fruit is positioned beneath the peel blade. A sponge roller or the like is used to push the label into contact with the fruit. Laid-on type labelers are typically less complicated and therefore more economical than bellows, compressed air or tamp apply types. Of course, laid-on type labels also have no requirement for vacuum pumps or air compressors.

The present invention is directed to a laid-on type labeler. A primary goal of all labeling manufacturers is to increase the speed of a labeller without sacrificing accuracy and reliability. A problem with increased speed in prior art laid-on labelers is the fact that the label web is threaded through the peel blade at the end of the articulating labeling arm. The label web is typically selectively advanced by an intermittent drive motor. Such drive motors must be capable of virtually instantaneous starts and stops but the inertial effects of these quick starts and stops can place an undue amount of torque on the end of the articulating labeling arm. Furthermore, prior art label web drives have generally driven only the take-up side of the label web, i.e. the "waste web" left after the labels are peeled off by the peel blade. This practice of driving just the take-up side of the web path places differential pressure on the label web at the peel blade. As label web speed increases, this differential pressure often has the effect of tearing or breaking the label web at the peel blade.

Thus, in prior art laid-on labelers, labeling speed was effectively limited by the torque placed on the articulating labeling arm by high speed starts and stops and by the increased differential pressure on the web at the peel blade caused by a powered web take-up side. Typical maximum speeds for known prior art laid-on labelers are in the range of 300–400 pieces of fruit per minute.

Another drawback to prior art laid-on labelers has been the manufacturer's tendency to use specially designed control circuitry to control the labelers. This places the customer at the mercy of the manufacturer for continued support of the labeler.

It is clear then, that a need exists for a laid-on labeler which is capable of substantially increased speed over prior art labelers, e.g. on the order of 700 pieces of fruit per minute or greater. Such a system should minimize any torque placed on the articulating labeling arm by rapid starts and stops of the label web drive motor and should also minimize stresses placed on the label web at the point of the peel blade, both of which allow for increasing labeling speed. Finally, the inventive labelling system should use available "off-the-shelf" electronics for control circuitry whenever possible.

SUMMARY OF THE INVENTION

In the practice of the present invention, an improved laid-on labeler is designed for substantially increased operating speeds when compared to prior art systems. The inventive labeler includes an articulating labeling arm near a free end of which is attached a label peel blade. The labeling arm is attached to a support structure at a pivot point. Immediately above and below the pivot point are a respective pair of deflecting idler rollers through which a continuous label web is fed. The pay-out side of the label web path is threaded atop the top idler roller while the take-up side of the label web path is threaded adjacent the bottom idler roller. With the pay-out and take-up sides of the web path being both supported at the center of the pivot point of the labeling arm, torque on the labeling arm from starting and stopping the label web is minimized. Also on the pay-out side of the label web path, the label web is fed from a pay-out reel to a position between a first nip roll and a drive roller. The drive roller is relatively large as compared to prior art drive rollers, e.g. on the order of 3+" in diameter compared to 1–2" for prior art systems. Thus the labeling web in the inventive system is capable of considerably greater speed than known labelers, i.e. the ratio of the circumference of the drive roller to the RPM of the drive roller is greater. On the take-up side of the label web path, the waste web also passes between the drive roller and a second nip roll. With this arrangement, both the pay-out side and the take-up side of the web path are driven simultaneously. This relieves the differential tension on the label web as it passes over the peel blade, thus minimizing or eliminating tearing and breaking of the web as drive speeds increase.

The inventive labeler includes a stepping motor which is directly connected to the drive roller and indirectly connected via a belt drive to a take-up reel. The stepping motor is controlled by motor driver which is, in turn, controlled by a programmable logic controller (PLC) which is a widely available off-the-shelf circuit. The PLC is programmed to recognize the presence of a piece of fruit on a conveyor by receiving an input from a first fiber-optic sensor. The precise position of labels on the label web are also sensed by a second fiber-optic sensor, with this information also being fed to the PLC. In response, the PLC times the beginning of and the duration of an electrical pulse to the stepper motor such that a length of label web is fed past the peel blade precisely as the sensed piece of fruit passes beneath the peel blade. Additionally, the PLC can provide a counting function by simply stepping an internal or external counter each time a piece of fruit and/or a label is sensed by the first and second fiber-optic sensors, respectively. The PLC is also provided with additional inputs and outputs for controlling a variety of functions, such as, for example, a low label alarm.

OBJECTS AND ADVANTAGES OF THE INVENTION

The principle objects and advantages of the present invention include, but are not limited to: providing an improved high speed labeler for labeling fruit, vegetables, or other discrete small objects on a conveyor; providing such a labeler with a unique label web path which minimizes adverse torque on an articulating labeling arm; providing such a labeler in which both a pay-out side and a take-up side of a label web path are driven by a common drive roller to minimize differential tension on the web at the point of a peel blade; providing such a labeler in which the articulating labeling arm is constructed of light-weight material with cut-outs along its length to minimize weight; providing such a labeler in which the common drive roller is of a relatively large diameter to increase web speed and, therefore, labeling speed as well; providing such a labeler in which the control circuitry is largely constructed of widely available off-the-shelf PLC's and associated peripherals; and providing such a labeler which is reliable, durable, economical to manufacture, and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Prior Art Laid-On Labeler

Figure 1:
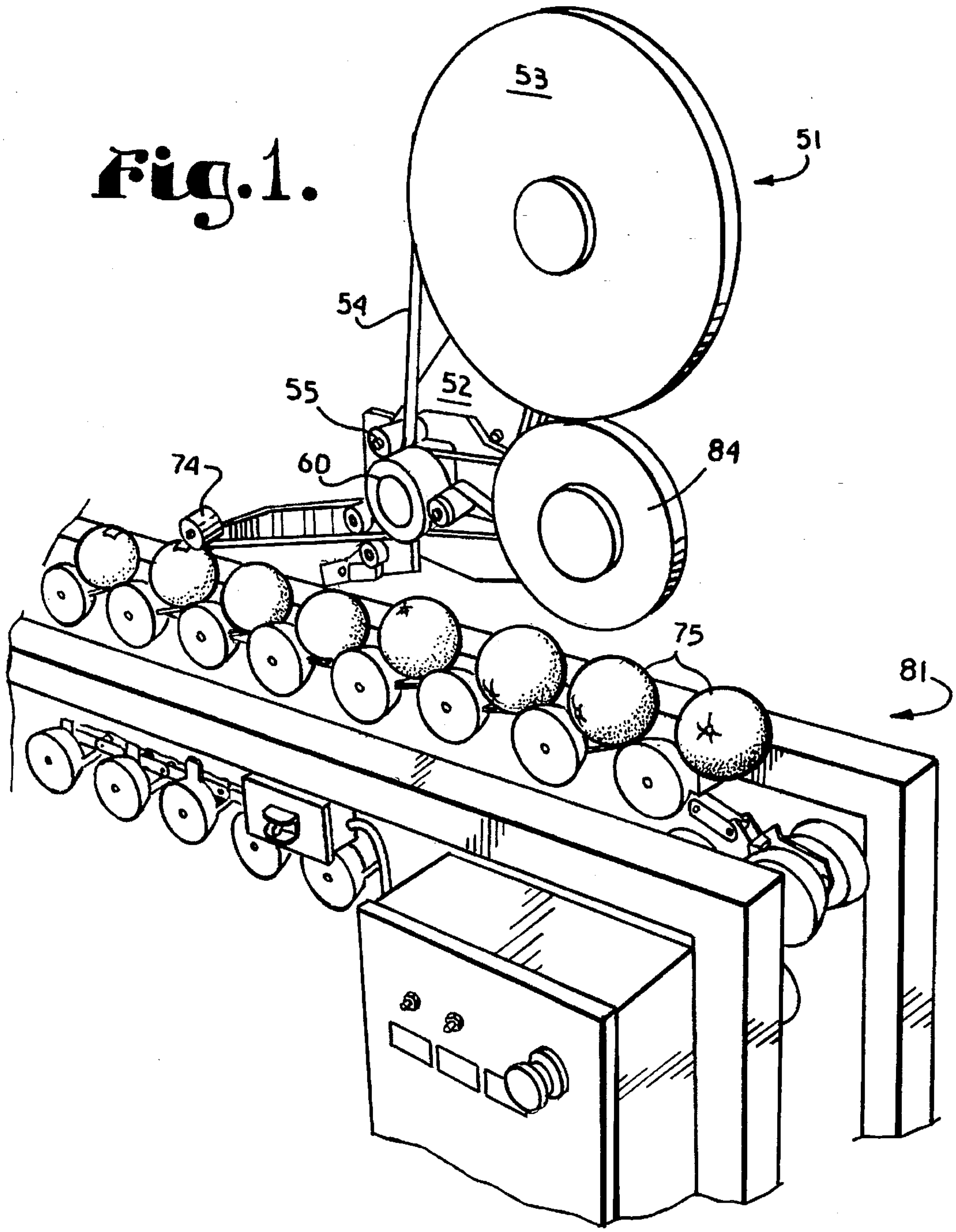
FIG. 1 is a perspective view of a laid-on labeling system in accordance with the present invention, shown labeling fruit on a conveyor.
Figure 5:
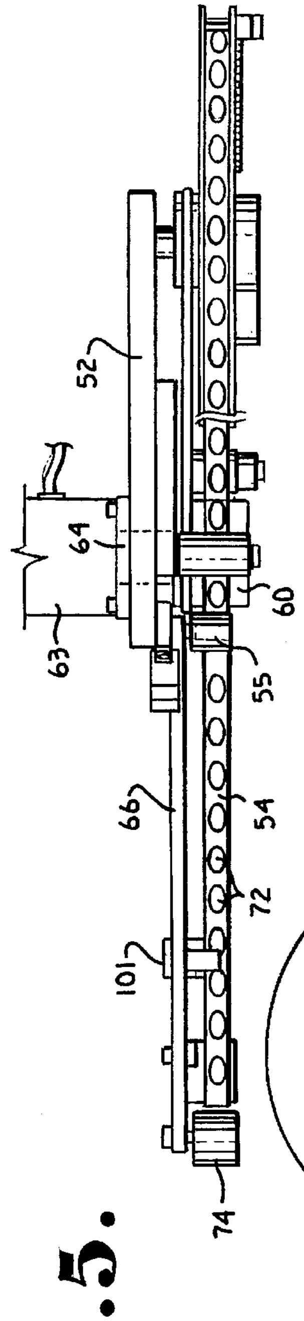
FIG. 5 is a top plan view of the laid-on labeler of FIG. 3.
Figure 2:
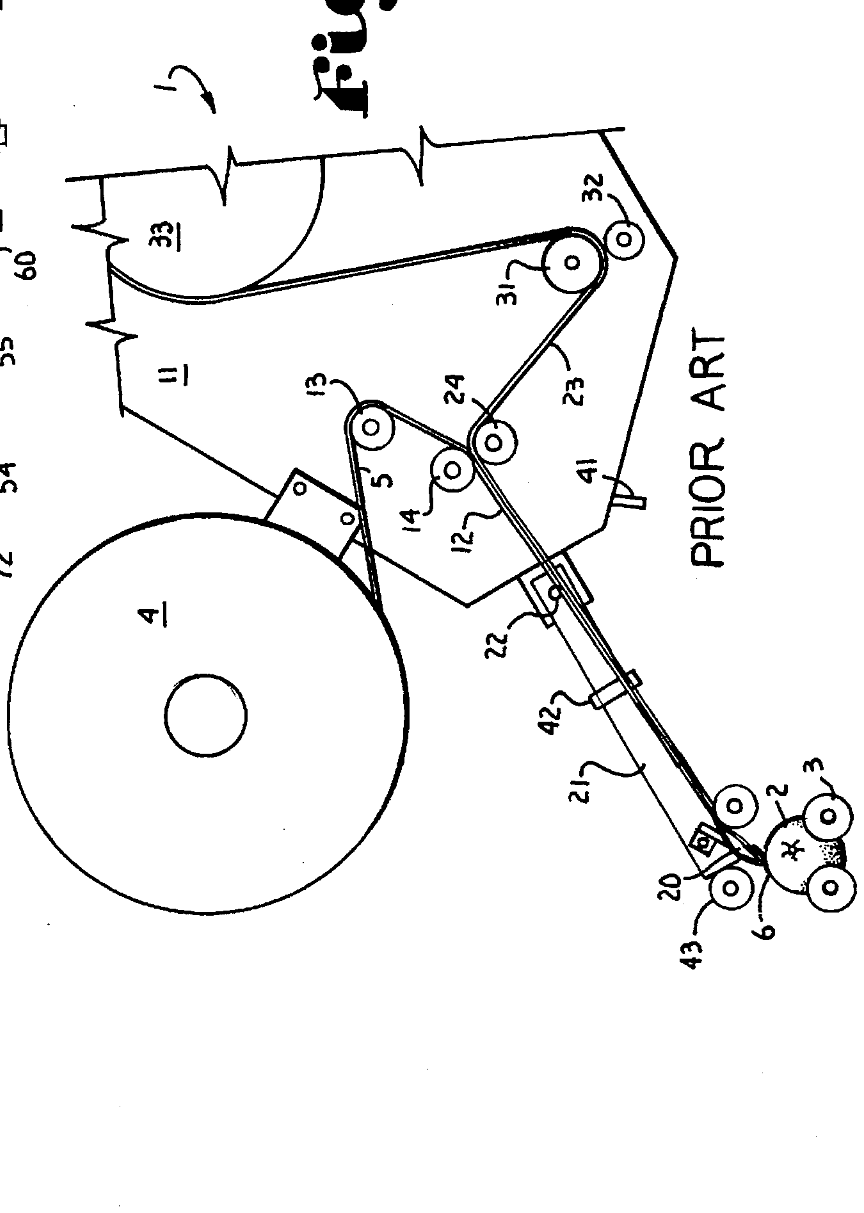
FIG. 2 is an illustration of a representative prior art laid-on labeler.
Figures 3, 4:
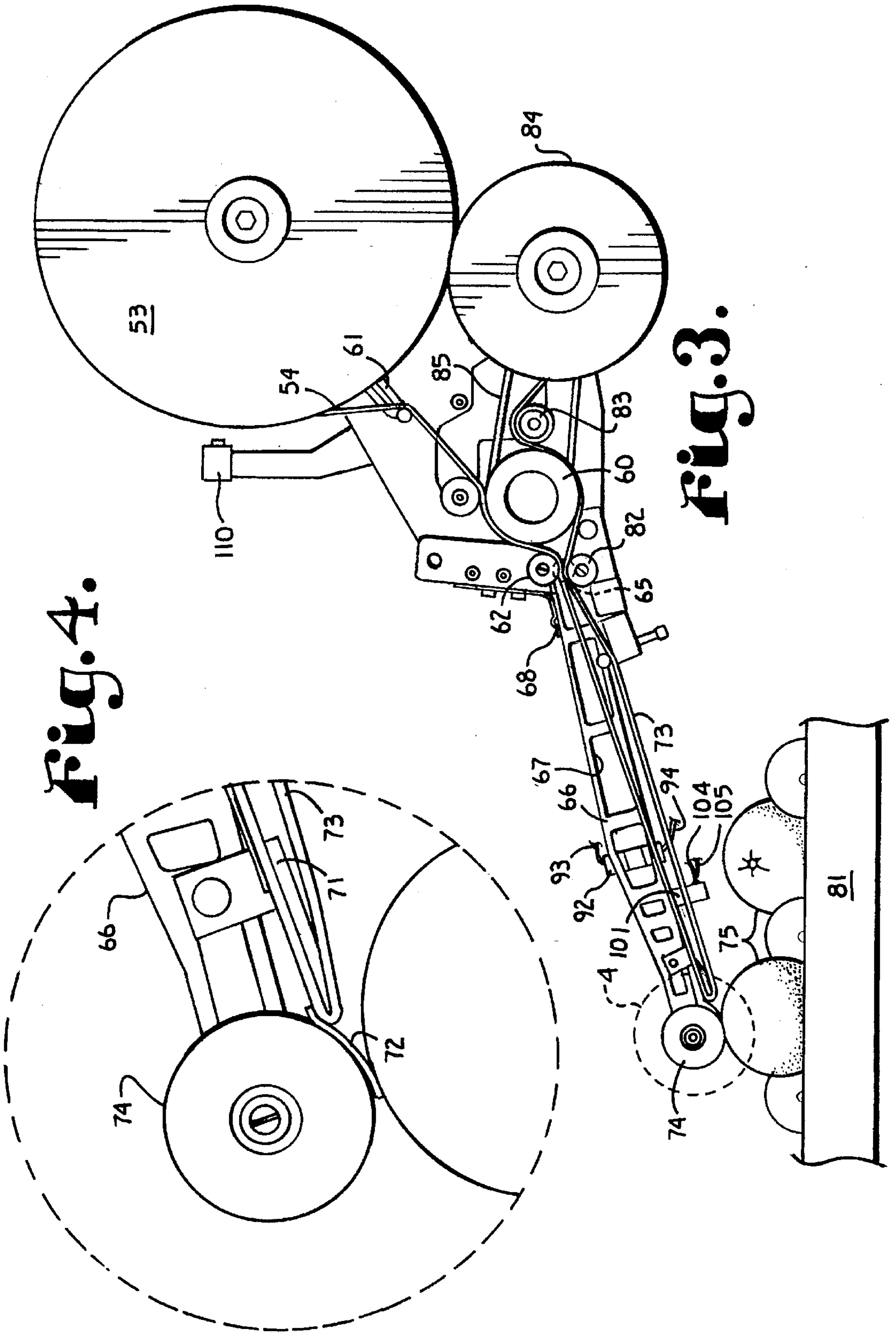
FIG. 3 is an enlarged, side elevational view of the laid-on labeler of FIG. 1.
FIG. 4 is a greatly enlarged, fragmentary side elevational view of the portion of the labeler of FIG. 3 labeled as "FIG. 4", and illustrating the peel blade and label web.

Referring to the drawings in more detail, FIG. 2 illustrates a representative prior art laid-on labeler, generally indicated as 1. The labeler 1 is shown labeling individual pieces of fruit 2 which are traveling along a conveyor 3. It should be noted that, although for ease of illustration, a single conveyor line 3 and a single labeler 1 are illustrated, typically this type of labeling operation involves multiple labelers 1 arrayed above respective multiple conveyor lines 3. The prior art labeler 1 includes a supply reel 4 which carries a web 5 of labels 6. The supply reel 4 is rotatably mounted on a frame 11. The web 5 can be made of waxed paper or a similar material designed to allow the labels 6 to minimally adhere to an outer surface 12 of the web 5. From the supply reel 4, the web 5 follows a path through a pair of deflecting rollers 13 and 14 and thence out to and around a peel blade 20 positioned at the end of an articulating labeling arm 21. The labeling arm 21 is pivotable about the frame 11 at a pivot point 22. The web, now labeled as 23, after leaving the peel blade 20, then follows a path through an additional deflecting roller 24 to a position between a drive roller 31 and a nip roll 32. The web 23 then extends to a powered take-up reel 33. As the web 5 is pulled around the peel blade 20 by the action of the drive roller 31 and the nip roll 32, the labels 6 are peeled off of the web 5, leaving the web 23, which is a "waste web", which is then reeled up on the take-up reel 33. Of course, the waste web 23 is merely the web 5 with the labels 6 removed therefrom. A fruit sensor 41 is used to sense the presence of a piece of fruit 2 on the conveyor 3, with a drive motor (not shown) selectively powered to drive the drive roller 31 in response. The drive roller 31 is advanced just sufficiently to advance the label web 5/23 by one label length. A label sensor 42 senses the length of a label 6 to thereby control the degree to which the drive motor advances the drive roller 31. A single one of the labels 6 is thus peeled off of the web 5 by the peel blade 20 and "laid-on" to the piece of fruit 2 via a roller 43, which can be made of a sponge-like material. The labeler 1 is thus cycled to await the next piece of fruit 2 sensed by the fruit sensor 41.

The prior art labeler 1 suffers from a number of drawbacks which restrict its speed of operation. The label web 5, in following a path out to the peel blade 20 at the end of the labeling arm 21, imparts an undesired torque to the labeling arm 21 whenever the drive roller 31 is advanced. If the speed of advancement of the web 5 is too great, i.e. if the drive roller 31 is of too great a diameter and/or is spinning too fast, the torque imparted to the labeling arm 21 can cause the labeling arm 21 to be jerked away from the fruit pieces 2 just as the label 6 is to be applied. Another problem with the prior art labeler 1 is that, since the web 5/23 is only pulled by the action of the drive roller 31, i.e. on the take-up side of the peel blade 20, differential pressure is applied to the web 5/23 across the peel blade 20. Thus, if the drive roller 31 is operated at too high a speed, the differential pressure can cause the web 5/23 to chatter or rub across the peel blade 20, resulting in tears or even breakage of the web 5/23.

III. Improved High Speed Labeler

Referring to FIGS. 1 and 3–6, a labeler according to the present invention is illustrated and generally indicated at 51. The labeler 51, much like the prior art labeler 1, includes a support frame 52 upon which a supply reel 53 is rotatably mounted. The supply reel 53 holds a web of labels 54 which web 54 is paid out through a path from the supply reel 53, between a first nip roller 55 and a drive roller 60. The supply reel 53 can include a spring loaded dancer arm 61 (shown only in FIG. 3) for accommodating shock loads and slack in the web 54 during pay-out. From the first nip roller 55, the web 54 extends to a deflecting roller 62. The drive roller 60 is driven by a stepper motor 63 attached to the rear of the support frame 52 with a drive shaft 64 (in phantom lines in FIG. 5) extending therethrough. The stepper motor 63 is selectively operated to drive the drive roller 60, with the friction between the drive roller 60 and the first nip roll 55 pushing the web 54 toward the deflecting roller 62. Due to the unique features of the inventive labeler 51 which allow greater web speeds, as described below, the drive roller 60 is approximately 3" in diameter as compared to prior art drive rollers, such as the drive roller 31 of FIG. 2, which typically range from 1" to 2" in diameter. The drive roller 60 is preferably coated with a resilient surface as of very long life polyurethane or the like for increased drive friction and longevity. The deflecting roller 62 is positioned so that its bottommost tangential point comes almost into contact with the uppermost tangential point of a deflecting roller 82. This tangential meeting point of the circumferences of the rollers 62 and 82 is directly over a pivot point 65 (as shown in phantom lines in FIG. 3) of a labeling arm 66. The labeling arm 66 is thus pivotable with respect to the support frame 52.

The labeling arm 66 includes a number of cut-outs 67, shown here as generally rectangular. The cut-outs 67 serve to decrease the weight and mass of the labeling arm 66. The labeling arm 66 is urged downward by an adjustable leaf-type spring 68 which is attached to the support frame 52. The web 54 extends outward along the labeling arm 66 and then around a peel blade 71 where individual labels 72 are peeled from the web 54 to leave a waste web 73. A resilient roller 74 is rotatably mounted on the labeling arm 66 past the peel blade 71 and the roller 74 serves to urge the individual labels 72 into contact with pieces of fruit 75 on a conveyor 81. The waste web 73, after leaving the peel blade 71, then is threaded above the second deflecting roller 82 which is positioned as described above. Thus the web 54/73, in the pay-out and the take-up path, passes almost directly over the center of the labeling arm pivot mount 65, which serves to minimize any torque effect of the web 54/73 on the labeling arm 66. This arrangement allows a substantially increased web speed, and thus proportionately higher labeling rates, than can be achieved by prior art labelers such as the prior art labeler 1 of FIG. 2.

From the second deflecting roller 82, the waste web 73 passes beneath the drive roller 60 and then between the drive roller 60 and a second nip roll 83 where the waste web 73 is pulled by the action of the drive roller 60 and the nip roll 83. Thus, the combined action of the first nip roll 55 and the drive roller 60 in pushing the supply side of the web 54 and the pulling action of the drive roller 60 and the second nip roll 83 on the waste web 73 minimizes any differential pressure on the web 54/73 at the site of the peel blade 71. This prevents the web 54/73 from being tom or split by the peel blade 71, as is prevalent in prior art labelers such as the labeler 1. Thus, the inventive labeler 51 can be operated at significantly higher speeds without danger of breaking or tearing the web 54/73 at the peel blade 71.

From the nip roll 83, the waste web 73 is fed into a take-up reel 84 which is driven by the stepper motor 63 by a belt 85 extending from the drive shaft 64 to the take-up reel 84. The waste web 73 is thus fed onto the driven take-up reel 84.

A fiber-optic optical label gap sensor 92 (FIGS. 3 and 6) is attached to the labeling arm 60. The label gap sensor 92 includes a pair of fiber-optic cables 93 and 94 which terminate with ends opposite each other on either side of the web 54. A photo-emitter 95 and a photo-detector 96 (FIG. 6) are positioned to send and receive, respectively, light from the cables 93 and 94 in order to detect the relative opacity of the web 54, as will be explained below.

A fiber-optic optical fruit detector 101 is also attached to the labeling arm 60 to detect the presence of a piece of fruit, such as the fruit 75 on the conveyor 81. The detector 101 includes a photo-emitter 102 and a photodetector 103 connected to respective fiber-optic cables 104 and 105. The cable 104 directs light from the photo-emitter 102 downward toward the conveyor 81 while the cable 105 receives reflected light from the conveyor 81 and any fruit 75 thereon, which reflected light is conducted back to the photo-detector 103.

Figure 6:
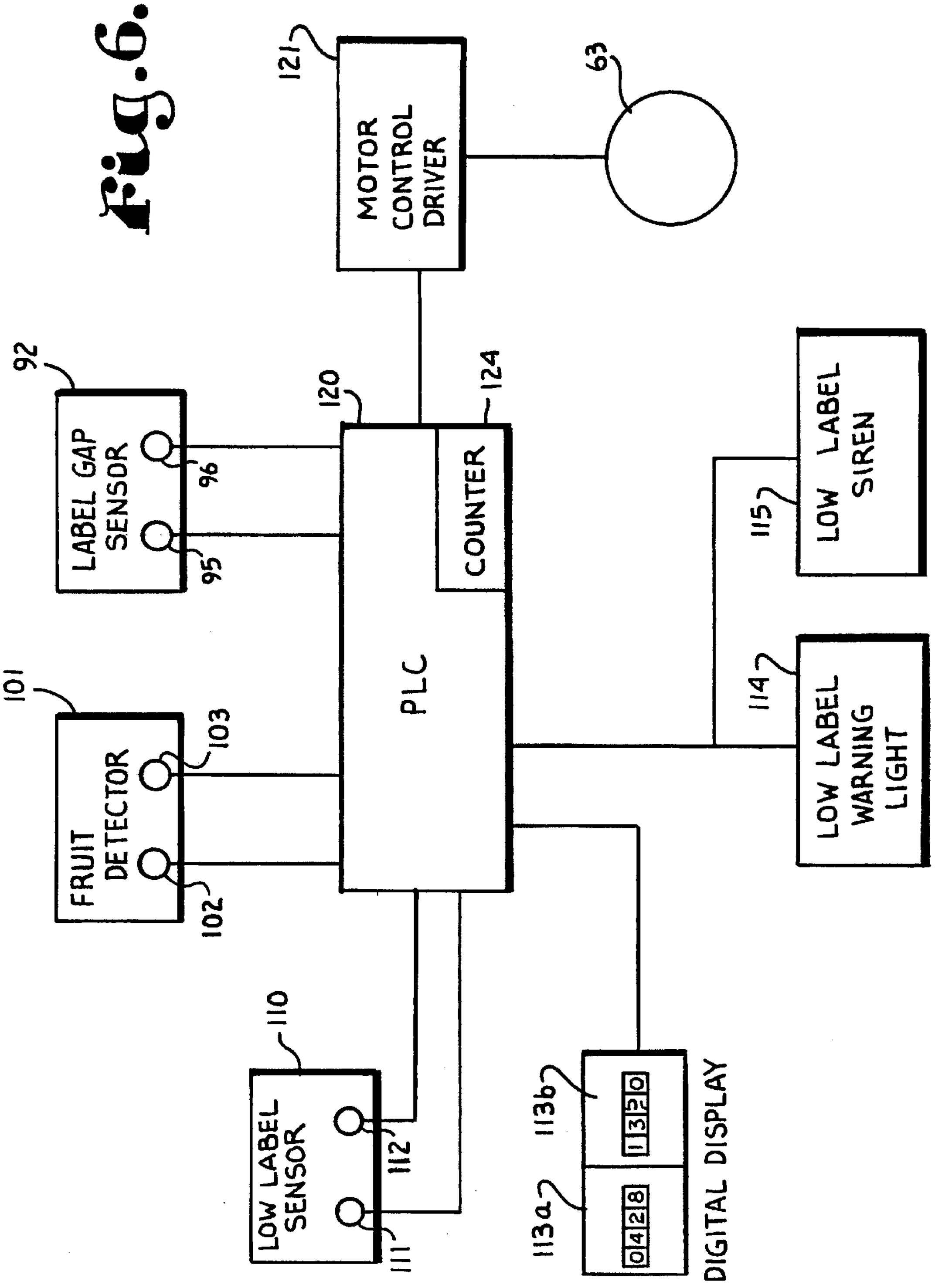
FIG. 6 is a block schematic electrical diagram of a control and drive circuit for the laid-on labeler of FIGS. 1 and 3–5.

An optional photo-eye low label sensor 110 (shown only in FIGS. 3 and 6) is attached to direct a series of light pulses toward the label web 54 from a photoemitter 111 (FIG. 6). Returned pulses are detected by a photodetector 112 with the time between emitted and returned pulses being used to calculate a distance. The distance from the sensor 110 to the label web 54 is indicative of the remaining web on the supply reel 53. This amount can be displayed on an optional display 113*a* (FIG. 6) as remaining web inches, feet, etc., and/or it can be used to trigger a low label alarm such as a warning light 114 or a siren 115.

Referring further to FIG. 6, a programmable logic controller (PLC) 120 is illustrated. The PLC 120 provides a drive pulse to the motor 63 via a motor control driver circuit 121 to selectively advance the drive roller 60. The PLC 120 is also connected to the photo-emitter 95 and the photo-detector 96 of the label gap sensor 92. The PLC 120 causes the photo-emitter 95 to emit a series of light pulses which are directed toward the web 54. By detecting the amount of light received by the photo-detector 96 for each emitted light pulse, the PLC detects a change in the opacity of the web 54 as the web 54/73 is advanced. This change in opacity indicates the arrival of a leading edge (or a trailing edge depending upon the logic) of a label 72 between the fiber-optic cables 93 and 94. In response to the sensing of the label leading edge, the drive pulse is ended, thus stopping the stepper motor 63. The PLC 120 is also connected to the photo-emitter 102 and the photo-detector 103 of the fruit detector 101. The PLC 120 is responsive to the photo-emitter 102 emitting a series of light pulses and creates a time window for each such pulse during which the photo-detector 103 is monitored for a reflected return pulse. If a reflected pulse is received during the time window, this indicates the presence of a piece of fruit 75 directly beneath the fruit detector 101 on the conveyor 81. By contrast, if no return pulse is received within the time window, no fruit 75 is present on the conveyor 81. The PLC 120 is responsive to the sensing of a piece of fruit 75 beneath the fruit detector 101 to start the drive pulse to the stepper motor 63 so that a single label 72 is advanced and applied to the piece of fruit 75.

The PLC 120 is also connected to the low label sensor 110 to calculate the amount of label web 54 remaining in the supply reel 53. In response to the transit time of pulses emitted and received by the photoemitter and photodetector 111 and 112, respectively, the PLC 120 calculates the remaining length of web 54 and displays it on the display 113*a*, as mentioned above, as well as the low label warning light 114 and/or the warning siren 115. The PLC 120 sends a signal to the warning light 114 and/or the warning siren 115 when the label web 54 remaining reaches a predetermined critical level. The PLC 120 also has an internal counter 124 which is connectable to the fruit detector 101 or the label gap sensor 92 to count the number of fruit pieces 75 or labels 72. The running total of labeled fruit pieces 75 can thus be displayed on the display 113*b* as well.

The PLC 120, can be, for example, a Matsushita NAIS FP1-C14. The stepper motor 63 can be a Stepper Motor MYCOM PF 5913HAC while the motor driver 121 can be a MYCOM UPS53 driver.

It should be noted that the deflecting rollers 62 and 82 could be replaced with stationary pins or the like. Furthermore, the optical sensor 101 could be replaced with a limit switch with a mechanical feeler and the feeler arm 111 and rheostat 112 could be replaced with an optical web sensor positioned adjacent the supply reel 53.

It is to be understood that while certain forms of the present invention, including dimensions and materials, have been illustrated and described herein, it is not to be limited to the specific forms or arrangement of parts described and shown.

What is claimed is:

1. A high speed laid-on type labeler comprising:

a. a support frame;

b. a supply reel containing a labeling web;

c. a drive means for driving said web through a labeling path;

d. an articulating labeling arm including a peel blade, said peel blade being positioned in said labeling path and defining a point between a supply side and a take-up side of said labeling path, said labeling arm being pivotably connected to said support frame via a pivot mount such that said labeling arm is free to pivot about said support frame during labeling to accommodate different sizes of articles to be labeled; and e. web deflecting means in said labeling path for deflecting said web to a position proximate said pivot mount such that any effects of torque on said labeling arm from said web are minimized.

2. A labeler as in claim 1, said web deflecting means comprising:

a. first deflecting means for deflecting said labeling web on said supply side to said position proximate said pivot mount.

3. A labeler as in claim 2, wherein said first deflecting means comprises a deflecting roller.

4. A labeler as in claim 2, said web deflecting means further comprising:

a. second deflecting means for deflecting said labeling web on said take-up side to said position proximate said pivot mount.

5. A labeler as in claim 4, wherein said second deflecting means comprises a deflecting roller.

6. A labeler as in claim 1, said drive means comprising:

a. a drive roller;

b. power means for selectively powering said drive roller to advance said label web; and c. a first nip roller positioned proximate said drive roller in said supply side of said labeling path for pinching said label web between said drive roller and said first nip roller to thereby advance said label web on said supply side.

7. A labeler as in claim 6, wherein said power means comprises a stepper motor.

8. A labeler as in claim 6, said drive means further comprising:

a. a second nip roller positioned proximate said drive roller in said take-up side of said labeling path for pinching said label web between said drive roller and said second nip roller to thereby advance said label web on said take-up side.

9. A labeler as in claim 8, wherein said power means comprises a stepper motor.

10. A labeler as in claim 1, and further comprising control means for selectively starting and stopping said drive means to advance said label web sufficient for a single label application, said control means comprising:

a. a programmable logic controller (PLC) connected to said drive means to provide a drive pulse to said drive means; and b. sensing means for providing input variables to said PLC to control said drive pulse.

11. A labeler as in claim 10, wherein said sensing means comprises:

a. a label gap sensor positioned on said labeling arm to detect the gap between two adjacent labels on said label web, said label gap sensor providing a signal to said PLC upon sensing each said label gap.

12. A labeler as in claim 10, wherein said labeler is positioned above a conveyor carrying a plurality of discrete objects to be labeled, said sensing means further comprising:

a. an object sensor for detecting individual objects on said conveyor, said object sensor providing a timing signal to said PLC upon detection of a said object.

13. A labeler as in claim 10, and further comprising:

a. low label sensor means associated with said supply reel for detecting the mount of label web remaining on said supply reel and for generating a variable signal indicating said label web amount, said low label sensor means being connected to said PLC to provide said variable signal to said PLC; and b. indicator means for indicating the amount of label web remaining on said supply reel, said indicator means also being connected to and controlled by said PLC.

14. A labeler as in claim 13, wherein said indicator means comprises a digital display.

15. A labeler as in claim 13, wherein said indicator means comprises at least one of a visual and an audible low web condition alarm.

16. A high speed laid-on type labeler comprising:

a. a support frame;

b. a supply reel containing a labeling web;

c. a drive means for driving said web through a labeling path, said drive means comprising:

i. a drive roller;

ii. power means for selectively powering said drive roller to advance said label web;

iii. a first nip roller positioned proximate said drive roller in a supply side of said labeling path for pinching said label web between said drive roller and said first nip roller to thereby advance said label web on said supply side; and iv. a second nip roller positioned proximate said drive roller in a take-up side of said labeling path for pinching said label web between said drive roller and said second nip roller to thereby advance said label web on said take-up side; and d. an articulating labeling arm including a peel blade, said peel blade being positioned in said labeling path and defining a point between said supply side and said take-up side of said labeling path, said labeling arm being pivotably connected to said support frame via a pivot mount such that said labeling arm is free to pivot about said support frame during labeling to accommodate different sizes of articles to be labeled.

17. A labeler as in claim 16, and further comprising web deflecting means in said labeling path for deflecting said web to a position proximate said pivot mount such that any effects of torque on said labeling arm from said web are minimized.

18. A labeler as in claim 17, said web deflecting means comprising:

a. first deflecting means for deflecting said labeling web on said supply side to said position proximate said pivot mount.

19. A labeler as in claim 18, wherein said first deflecting means comprises a deflecting roller.

20. A labeler as in claim 18, said web deflecting means further comprising:

a. second deflecting means for deflecting said labeling web on said take-up side to said position proximate said pivot mount.

21. A labeler as in claim 20, wherein said second deflecting means comprises a deflecting roller.

22. A labeler as in claim 17, and further comprising control means for selectively starting and stopping said drive means to advance said label web sufficient for a single label application, said control means comprising:

a. a programmable logic controller (PLC) connected to said power means to provide a drive pulse to said power means; and b. sensing means for providing input variables to said PLC to control said drive pulse.

23. A labeler as in claim 22, wherein said sensing means comprises:

a. a label gap sensor positioned on said labeling arm to detect the gap between two adjacent labels on said label web, said label gap sensor providing a signal to said PLC upon sensing each said label gap.

24. A labeler as in claim 23, wherein said labeler is positioned above a conveyor carrying a plurality of discrete objects to be labeled, said sensing means further comprising:

a. an object sensor for detecting individual objects on said conveyor, said object sensor providing a timing signal to said PLC upon detection of a said object.

25. A labeler as in claim 22, and further comprising:

a. low label sensor means associated with said supply reel for detecting the amount of label web remaining on said supply reel and for generating a variable signal indicating said label web amount, said low label sensor means being connected to said PLC to provide said variable signal to said PLC; and b. indicator means for indicating the amount of label web remaining on said supply reel, said indicator means also being connected to and controlled by said PLC.

26. A labeler as in claim 25, wherein said indicator means comprises a digital display.

27. A labeler as in claim 25, wherein said indicator means comprises at least one of a visual and an audible low web condition alarm.

28. A high speed laid-on type labeler comprising:

a. a support frame;

b. a supply reel containing a labeling web;

c. a drive means for driving said web through a labeling path;

d. an articulating labeling arm including a peel blade, said peel blade being positioned in said labeling path and defining a point between a supply side and a take-up side of said labeling path, said labeling arm being pivotably connected to said support frame at a pivot mount such that said labeling arm is free to pivot about said support frame during labeling to accommodate different sizes of articles to be labeled;

e. control means for selectively starting and stopping said drive means to advance said label web sufficient for a label application, said control means comprising:

i. a programmable logic controller (PLC) connected to said drive means to provide a drive pulse to said drive means; and ii. sensing means for providing input variables to said PLC to control said drive pulse.

29. A labeler as in claim 28, wherein said sensing means comprises:

a. a label gap sensor positioned on said labeling arm to detect the gap between two adjacent labels on said label web, said label gap sensor providing a signal to said PLC upon sensing each said label gap.

30. A labeler as in claim 29, wherein said labeler is positioned above a conveyor carrying a plurality of discrete objects to be labeled, said sensing means further comprising:

a. an object sensor for detecting individual objects on said conveyor, said object sensor providing a timing signal to said PLC upon detection of a said object.

31. A labeler as in claim 28, and further comprising:

a. low label sensor means associated with said supply reel for detecting the amount of label web remaining on said supply reel and for generating a variable signal indicating said label web amount, said low label sensor means being connected to said PLC to said variable signal to said PLC; and b. indicator means for indicating the amount of label web remaining on said supply reel, said indicator means also being connected to and controlled by said PLC.

32. A labeler as in claim 31, wherein said indicator means comprises a digital display.

33. A labeler as in claim 31, wherein said indicator means comprises at least one of a visual and an audible low web condition alarm.

34. A labeler as in claim 28, said drive means comprising:

a. a drive roller;

b. power means for selectively powering said drive roller to advance said label web;

c. a first nip roller positioned proximate said drive roller in said supply side of said labeling path for pinching said label web between said drive roller and said first nip roller to thereby advance said label web on said supply side; and d. a second nip roller positioned proximate said drive roller in said take-up side of said labeling path for pinching said label web between said drive roller and said second nip roller to thereby advance said label web on said take-up side.

35. A labeler as in claim 28, and further comprising:

a. web deflecting means in said labeling path for deflecting said web to a position proximate said pivot mount such that any effects of torque on said labeling arm from said web are minimized.

36. A labeler as in claim 35, said web deflecting means comprising:

a. a first deflecting means for deflecting said labeling web on said supply side to said position proximate said pivot mount; and b. a second deflecting means for deflecting said labeling web on said take-up side to said position proximate said pivot mount.

37. A labeler as in claim 18, wherein said first and second deflecting means comprise deflecting rollers.

* * * * *